United States Patent [19]

Maida

[11] 4,063,138
[45] Dec. 13, 1977

[54] DRIVE CIRCUIT FOR PULSE SYNCHRONIZED MOTOR

[75] Inventor: Osamu Maida, Tokyo, Japan
[73] Assignee: Nippon Kogaku K.K., Tokyo, Japan
[21] Appl. No.: 634,334
[22] Filed: Nov. 24, 1975
[51] Int. Cl.² .............................................. H02P 5/00
[52] U.S. Cl. ................................... 318/318; 318/314; 318/341
[58] Field of Search ............ 318/314, 318, 341, 345 A, 318/345 B, 139

[56] References Cited
U.S. PATENT DOCUMENTS

| | | | |
|---|---|---|---|
| 3,008,075 | 11/1961 | Scott | 318/318 |
| 3,772,580 | 11/1973 | Odone | 318/318 |
| 3,971,974 | 7/1976 | Ichiyanagi | 318/341 |
| 4,002,962 | 1/1977 | Miller | 318/314 |

*Primary Examiner*—Robert K. Schaefer
*Assistant Examiner*—Eugene S. Indyk
*Attorney, Agent, or Firm*—Shapiro and Shapiro

[57] ABSTRACT

A drive circuit for pulse synchronized motor has a circuit for generating an output signal corresponding to the frequency of synchronizing pulse signals and a voltage setting circuit for automatically setting, according to the output of the output circuit, the voltage to be applied to the motor within a synchronizable voltage range of frequency of the synchronizing pulse signals for synchronizing the motor. The drive circuit is capable of automatically maintaining synchronized state over a wide frequency range.

17 Claims, 20 Drawing Figures

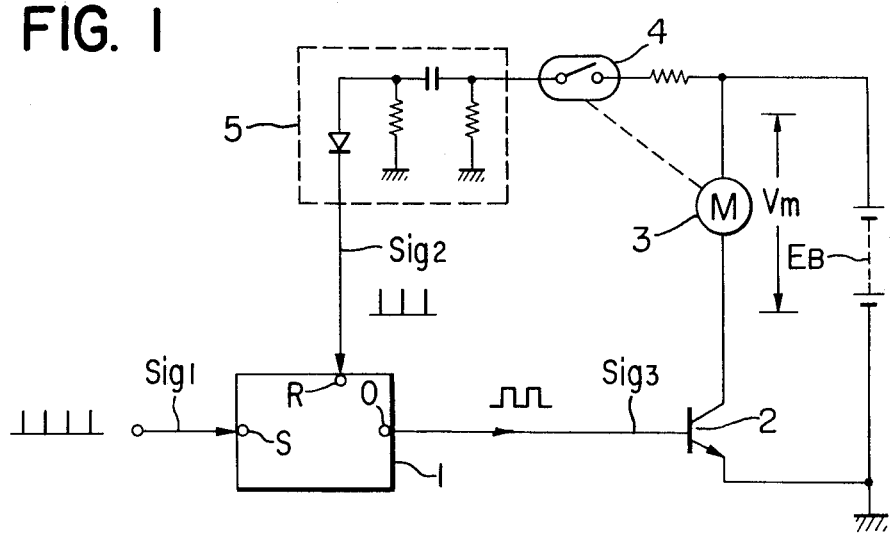
FIG. 1
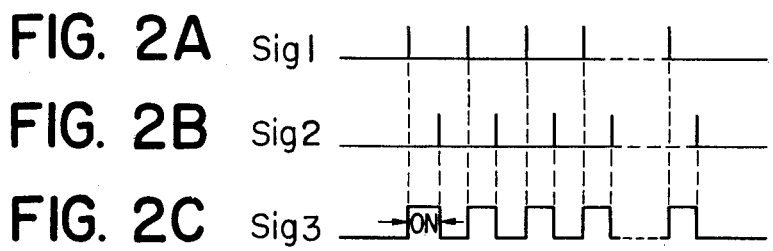
FIG. 2A Sig1
FIG. 2B Sig2
FIG. 2C Sig3
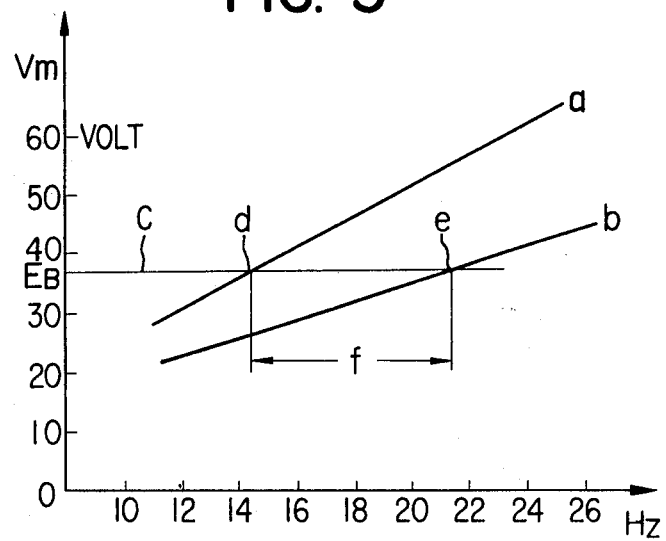
FIG. 3

DRIVE CIRCUIT FOR PULSE SYNCHRONIZED MOTOR

BACKGROUND OF THE INVENTION

1. Field of the Invention

The present invention relates to a drive circuit for a motor rotated in synchronization with synchronizing pulse signals, or a so-called pulse synchronized motor.

2. Description of the Prior Art

Such drive circuit for a pulse synchronized motor is utilized, for example, in pulse synchronized projectors or in pulse synchronized movie cameras. In a pulse synchronized projector, the pulse signals determining the projecting speed of film are recorded simultaneously with acoustic signals on an acoustic recording device such as a tape recorder, and thus recorded pulse signals are used at projection, simultaneously with the playback of said acoustic signals, for controlling the rotation of the motor of said projector thereby synchronizing the projected image with the acoustic signal. Also pulse synchronized movie cameras are used for a case of synchronized picture taking with plural cameras, for example three-dimensional motion-picture taking with two cameras or motion-picture taking from plural positions of a phenomenon for the purpose of observing time-dependent change thereof wherein the frames of the films in plural cameras have to be exposed at the same time. For such drive motors there has been proposed a drive circuit as shown in FIG. 1.

Referring to FIG. 1, 1 indicates a flip-flop circuit or a similar bistable circuit provided with two input terminals S and R, and a control output terminal O. A motor-control transistor 2 controls the supply of electric current to a direct current motor 3 according to the output signal Sig-3 of said control output terminal O of the bistable circuit 1. Said motor 3 is supplied with an electric current from a direct current supply $E_B$. Switch 4 is mechanically connected with the rotation of said motor 3 and performs on-off operations of a number proportional to the rotation of said motor 3. A differentiating circuit 5 generates motor speed pulse signals Sig-2 in response to the on-off operations of said switch 4. Thus, upon application of a synchronizing pulse signal Sig-1 to said input terminal S, said bistable circuit shifts to 'set' state to release an 'on' signal to said transistor 2 thereby permitting the supply of electric current to said motor 3, and upon receipt of a motor speed pulse signal Sig-2 said bistable circuit 1 shifts to 'reset' state to release an 'off' signal to the transistor 2 thereby interrupting the supply of electric current to said motor 3. By the suitable setting of the voltage of the direct current supply source $E_B$ the cycles of said synchronizing pulse signals Sig-1 and that of said motor speed pulse signals Sig-2 are maintained in a particular mutual phase relationship as shown in FIGS. 2A, 2B and 2C, and the motor 3 attains an average rotation speed proportional to the synchronizing pulse signals Sig-1 to realize synchronized control.

In the synchronized control by means of a circuit as explained above, there stands a certain relationship between the frequency of synchronizing pulse signals Sig-1 and the voltage $V_m$ applied to the motor 3 as shown in FIG. 3, which represents these two variables in abscissa and ordinate, respectively. In case of continuously elevating said voltage $V_m$ with synchronizing pulse signals of a given frequency, the motor 3, which is in an asynchronous state with a low rotation speed while the voltage is excessively low, assumes the synchronized state beyond a certain voltage wherein the average rotation speed thereof is proportional to the frequency of synchronizing pulse signals, and this state is maintained even when the voltage $V_m$ is further elevated within a certain range. Upon further elevation of the voltage beyond a certain limit, the motor 3 again enters an asynchronous state with a rotation speed higher than that instructed by the synchronizing pulse signals. Thus, in order to synchronize the rotation of motor 3 with the synchronizing signals of a given frequency, it is necessary to control the voltage $V_m$ applied to said motor within a range determined by an upper limit and a lower limit.

The lines (a) and (b) in FIG. 3 respectively indicate the upper and lower limit voltages at various frequencies. Stated differently FIG. 3 indicates that the motor 3 is in an asynchronous state with a rotation speed higher or lower than that indicated by the synchronizing pulse signals respectively when the point corresponding to the given frequency of synchronizing pulse signals and to the applied voltage $V_m$ is located above the line (a) or below the line (b), and is in a synchronized state when said point is located within the range between the lines (a) and (b), namely the synchronizable voltage range. In case of the circuit of FIG. 1 wherein the voltage $V_m$ applied to the motor is equal to the supply voltage $E_B$, a horizontal line (c) of voltage $E_B$ corresponding to the motor voltage crosses said lines (a) and (b) at the frequencies (d) and (e). Thus the portion between the lines (a) and (b), or defined by the upper and lower limit frequencies (d) and (e), represents the frequency range (f) synchronizable with the circuit of FIG. 1. In case of the circuit of FIG. 1, since a wide synchronizable frequency range is required for projectors or movie cameras, it becomes necessary to suitably regulate the motor voltage which is equal to the supply voltage $E_B$ if the synchronizing frequency is located outside said synchronizable frequency range (f). Also eventual fluctuation of supply voltage $E_B$ during the synchronized operation leads to a fluctuation of the motor voltage $V_m$ which may result in a shift from synchronized state to an asynchronous state.

SUMMARY OF THE INVENTION

The present invention has for its object to provide a drive circuit for a pulse synchronized motor capable of automatically maintaining a synchronized state over a wide frequency range.

BRIEF DESCRIPTION OF THE DRAWINGS

FIG. 1 is a diagram showing a prior drive circuit for a pulse synchronized motor;

FIGS. 2A, 2B and 2C are diagrams showing the phase relationship of synchronizing pulse signals, motor speed pulse signals and output signals of a bistable circuit in the synchronized state of circuit of FIG. 1;

FIG. 3 is a diagram showing the relation between the frequency of synchronizing pulse signals and the voltage applied to the motor in the circuit of FIG. 1;

DESCRIPTION OF THE PREFERRED EMBODIMENTS

Figure 4:
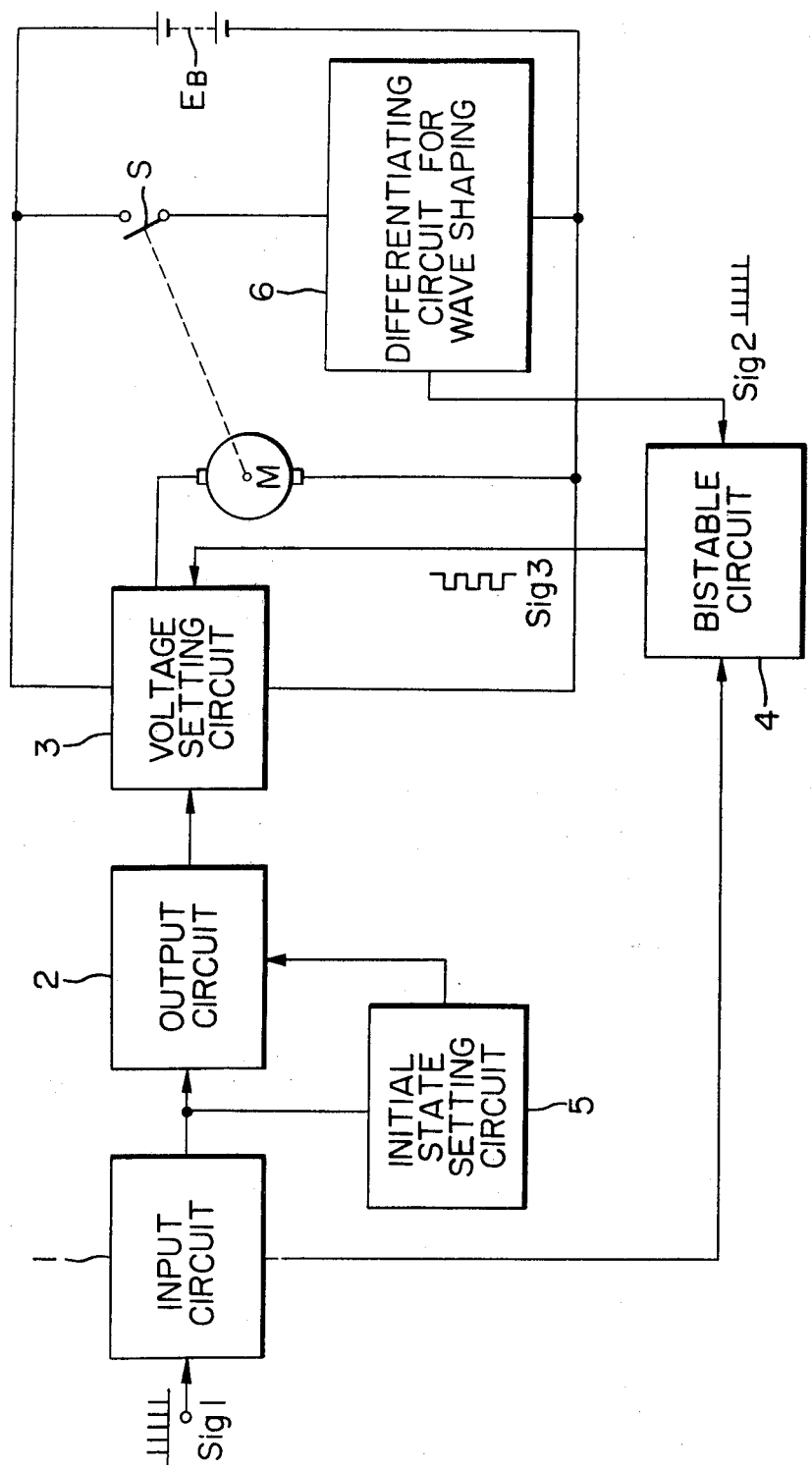
FIG. 4 is a block diagram of a drive circuit for a pulse synchronized motor of the present invention.

In the following the present invention will be explained with reference to the block diagram shown in FIG. 4, in which an input circuit 1 supplied the synchronizing pulse signals Sig-1 to a circuit 2 which generates an output signal in response to the frequency of said synchronizing pulse signals, a voltage setting circuit 3, a bistable circuit 4 and an initial state setting circuit 5. A differentiating circuit for wave shaping 6 generates motor speed pulse signals in response to the on-off operations of a switch S operably connected with the motor M, and said motor speed pulse signals are supplied to said bistable circuit 4. Said bistable circuit 4 is controlled by said synchronizing pulse signals Sig-1 and said motor speed pulse signals Sig-2, and generates the control output signals Sig-3. Said voltage setting circuit 3 is provided to determine the voltage applied to the motor in response to the output signal of said circuit 2 of which output is dependent on the frequency of said synchronizing pulse signals, and the function of said circuit 3 is controlled by the control output signal Sig-3 from said bistable circuit 4. Said initial state setting circuit 5 is provided to return, upon interruption of synchronizing pulse signals for a determined period, said circuit 2 which generates an output signal in response to the frequency of said synchronizing pulse signals to an initial state which corresponds to the application of synchronizing pulse signals of infinite frequency.

Figure 5:
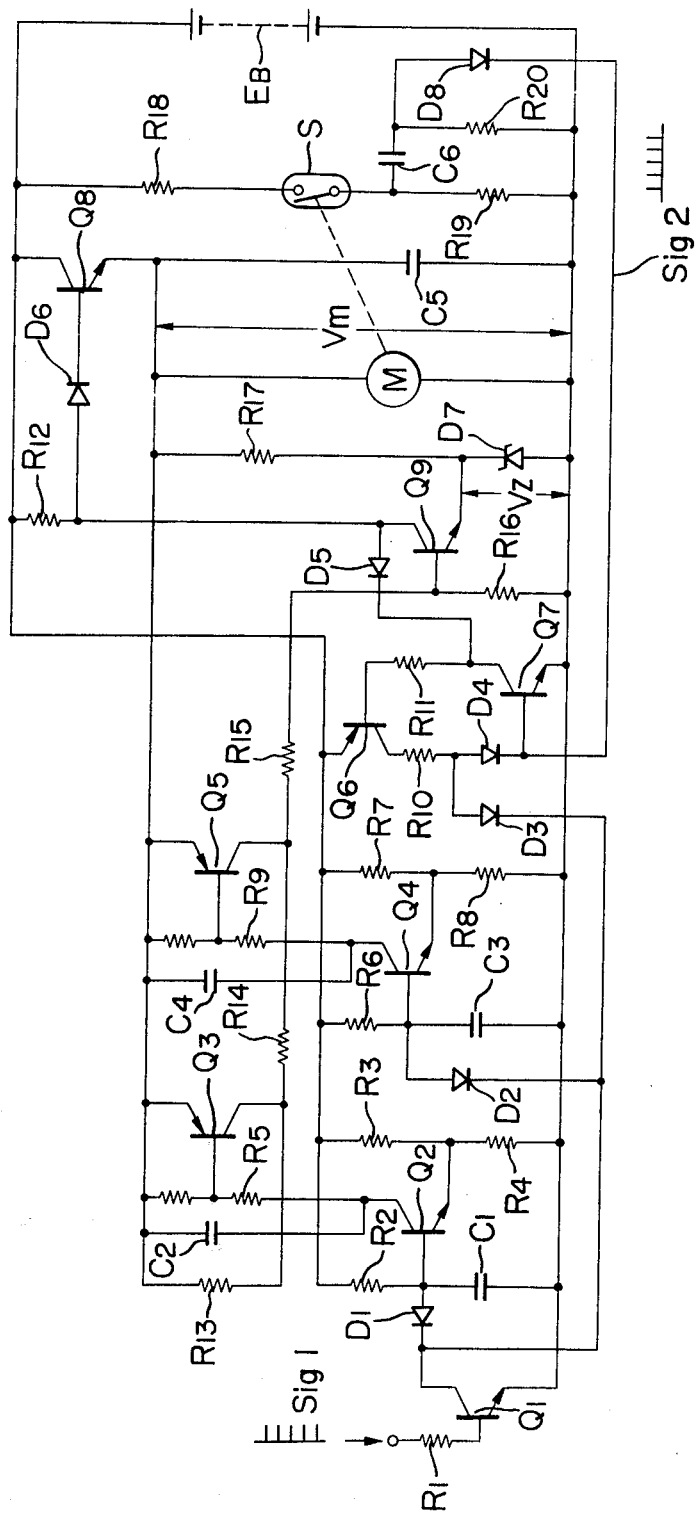
FIG. 5 is a circuit diagram of a first embodiment of the present invention.

In the following the present invention will be further clarified with respect to a first embodiment thereof shown in FIG. 5. A transistor Q1 is controlled by positive synchronizing pulse signals applied through a base resistor R1 and functions to shift the bistable circuit to an 'off' state as explained later and to reset the condenser of a frequency identifying circuit to be explained later. A first frequency identifying circuit is composed of an integrating resistor R2, an integrating condenser C1, bias resistors R3 and R4, and a potential detecting transistor Q2. Said condenser C1 is connected through a back-current impeding diode D1 to the collector of said transistor Q1 to discharge the charge thereof when said transistor Q1 is in a conduction state. A second frequency identifying circuit is composed of an integrating resistor R6, an integrating condenser C3, bias resistors R7 and R8, and a potential detecting transistor Q4. Said condenser C3 is connected through a back-current impeding diode D2 to the collector of said transistor Q1 to discharge the charge thereof when said transistor Q1 is in a conduction state. A transistor Q3 is connected at the base thereof through a serial resistor R5 to the collector of said transistor Q2 and assumes a conduction state when said transistor Q2 becomes conductive. Further, a first retaining condenser C2 is connected between the emitter of said transistor Q3 and the collector of said transistor Q2 so as to retain the conduction state of said transistor Q3 for a determined period after said transistor Q2 shifts from a conduction state to a cut-off state as will be explained later.

A transistor Q5 is connected at the base thereof through a serial resistor R9 to the collector of said transistor Q4 and assumes a conduction state when said transistor Q4 becomes conductive. Also a second retaining condenser C4 is connected between the emitter of said transistor Q5 and the collector of said transistor Q4 to perform a similar function as that of said first retaining condenser C2. Resistors R13, R14, R15 and R16 are connected in series between the terminals of the motor M to constitute a voltage dividing circuit, and the divided voltage on said resistor R16 of the motor voltage $V_m$ is applied to the base of a transistor Q9.

Further, said resistor R13 is connected between the emitter and collector of said transistor Q3 and serially connected resistors R13 and R14 are connected between the emitter and collector of said transistor Q5 so that the voltage dividing ratio is varied when said transistors Q3 and Q5 assume conductive state.

Assuming that $t_1$ is a period from the resetting of said condenser C1 in the first frequency identifying circuit by the shift of said transistor Q2 by the recharging of said condenser C1, and that $t_2$ is a corresponding period in the second frequency identifying circuit, the bias resistors in said circuits are selected so as to satisfy a condition $t_1 > t_2$. Transistors Q6 and Q7 of which bases and collectors are cross connected through resistors R10 and R11 and a level shift diode D4 constitute a positive-feedback bistable circuit corresponding to the bistable circuit shown in FIG. 1. The connecting point between said resistor R10 and said level shift diode D4 is further connected through a back-current imdeding diode D3 to the collector of said transistor Q1.

A motor control transistor Q8 connected in series between the direct current motor M and a direct current power supply $E_B$ determines the applied voltage $V_m$ to said motor M and is maintained in a conduction or cut-off state by means of the aforementioned bistable circuit. Said transistor Q8 is biased in forward direction by means of a resistor R12 and a level shift diode D6, which functions, in addition to the level shifting, to prevent the destruction of said transistor Q8 by the reverse induced voltage caused by the inertial rotation of said motor M when the connecting point between said resistor R12 and said diode D6 is shortcircuited to the negative pole of said power source $E_B$ in order to cut off the transistor Q8 as explained later.

The connecting point between said resistor R12 and said diode D6 is connected through a back-current impeding diode D5 to the collector of the transistor Q7 constituting a part of the aforementioned bistable circuit. Thus, when said bistable circuit is in the reset or conduction state thereof, the transistor Q8 is in the cut-off state as the base thereof is bypassed through the diode D5 to a potential nearly equal to that of the negative pole of said power source $E_B$, and assumes the conduction state when said bistable circuit is in the cut-off state as such bypassing does not take place.

Between the terminals of said motor M there are further connected in series a resistor R17 and Zener diode D7, and the connecting point therebetween is connected to the emitter of said transistor Q9, of which collector is connected to the connecting point between said resistor R12 and the diode D6 to constitute a negative feedback circuit thereby controlling the voltage $V_m$ applied to the motor.

A switch S is operable connected to said motor M and performs on-off operations of a number proportional to the rotation speed thereof. Said switch is connected at one terminal thereof to the positive pole of said power source $E_B$ through a resistor R18 and at the other terminal thereof to the negative pole of said power source through a resistor R19, and the connecting point between said resistor R19 and said switch S is connected through a condenser C6 and a diode D8 to the base of said transistor Q7 in said bistable circuit. Resistors R19 and R20, said condenser C6 and said diode D8 constitute a differentiating circuit for wave shaping, of which the output signal is used to reset said bistable circuit to the conduction state thereof.

Figure 6:
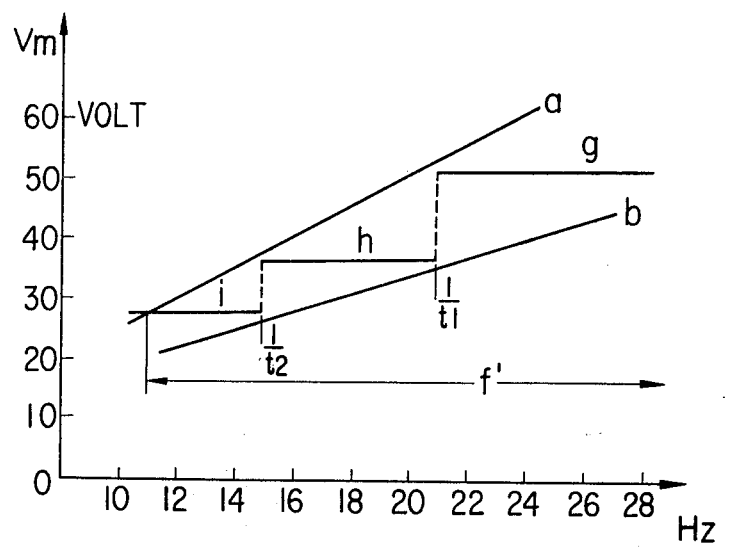
FIG. 6 is a diagram showing the relation between the frequency of synchronizing pulse signals and the voltage applied to the motor in the circuit of FIG. 5.

The circuit heretofore explained functions as follows. Said bistable circuit remains in the reset state thereof in the absence of the synchronizing pulse signals. Thus the transistor Q8 is in the cut-off state interrupting the supply of electric current to the motor M, which does not therefore rotate in this state. The condenser C1 in the first frequency identifying circuit is charged through the resistor R2 to reach a potential enough for shifting the transistor Q2 to the conduction state thereof. Similarly the transistor Q4 in the second frequency identifying circuit is maintained at the conduction state. However the retaining condensers C2 and C4 are not subjected to charging for shifting the transistors Q3 and Q5 to the conduction state thereof as the transistor Q8 is in the cut-off state. Then the transistor Q1 shifts to the conduction state upon application of synchronizing pulse signals thereto. In case the cyclic time $t_{in}$ of the synchronizing pulse signals is shorter than aforementioned $t_1$, the condenser C1 in the first frequency identifying circuit is periodically reset by the transistor Q1 to retain the transistors Q2 and Q3 in the cut-off state thereof. Similarly the transistors Q4 and Q5 are retained in the cut-off state thereof. On the other hand the bistable circuit is shifted to 'set' state by the conduction of said transistor Q1 to shift the transistor Q8 to the conduction state thereof thereby realizing the supply of electric current to the motor M. In this state the voltage $V_{m(g)}$ applied to the motor M is controlled by the transistor Q9 so as to be expressed by the following equation:

$$V_{m(g)} = \frac{R13 + R14 + R15 + R16}{R16} (V_z + V_{BE})$$

wherein $V_z$ is the Zener potential of the Zenar diode D7, $V_{BE}$ is the voltage between the base and emitter of said transistor Q9 and it is assumed that the base current $I_B$ is sufficiently smaller than the current in the resistors R13 - R16, since the transistors Q3 and Q5 are in the cut-off state in this condition. Upon start of rotation of the motor M the switch S performs closing operations to generate, from the aforementioned differentiating circuit, the motor speed pulse signals which are supplied to the transistor Q7 to reset said bistable circuit. Thus the transistor Q8 is shifted to the cut-off state to decelerate the motor M. In this manner the synchronized control is realized as explained in FIG. 1. In this case the frequency of the synchronizing pulse signals and the motor voltage $V_m$ are selected so as to correspond to the line (g) in FIG. 6, and the synchronization is realizable within a range represented by a portion thereof between the lines (a) and (b). Further, in case the frequency of the synchronizing pulse signals is lowered to realize a condition $t_2 > t_{in} > t_1$, the transistor Q2 of the first frequency identifying circuit shows conduction periods of $(t_{in} - t_1)$ in synchronization with the frequency of said synchronizing pulse signals.

Consequently the collector current of said transistor Q2 becomes an intermittent current, but the transistor Q3 is maintained in continuously conductive state by the function of said retaining condenser C2. On the other hand the transistors Q4 and Q5 are both maintained in the cut-off state thereof due to the condition $t_2 > t_{in}$ for the condenser C3 in the second frequency identifying circuit. In this manner the resistor R13 is shortcircuited by the conduction of said transistor Q3, and the motor is supplied with a voltage:

$$V_{m(h)} = \frac{R14 + R15 + R16}{R16} (V_z + V_{BE})$$

which is lower than $V_{m(g)}$ in case of $t_{in} > t_1$, to realize a synchronized rotation by the control of said bistable circuit. The relation of the frequency of synchronizing pulse signals and the motor voltage $V_m$ is represented by the line (h) in FIG. 6.

Figure 7:
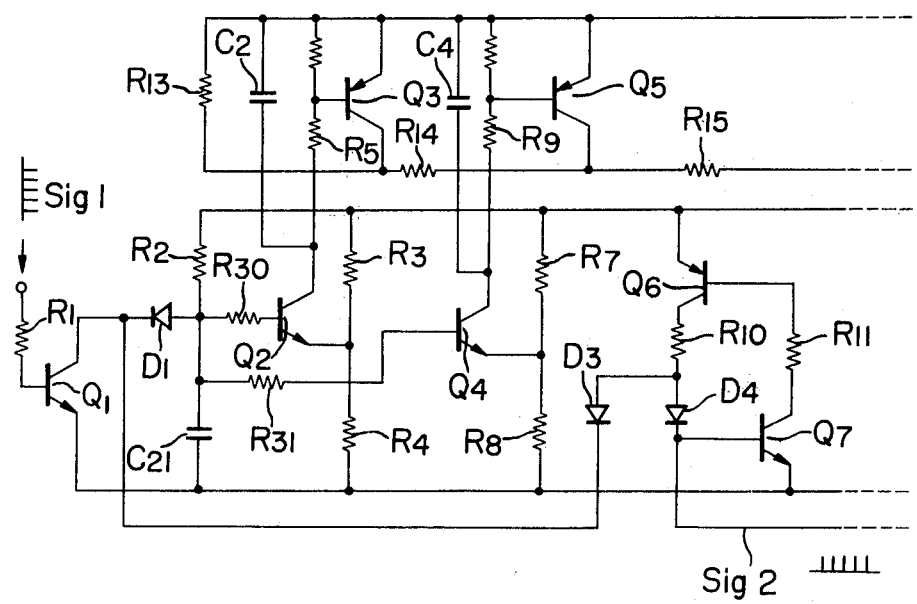
FIG. 7 is a circuit diagram of the second embodiment of the present invention.
Figure 8:
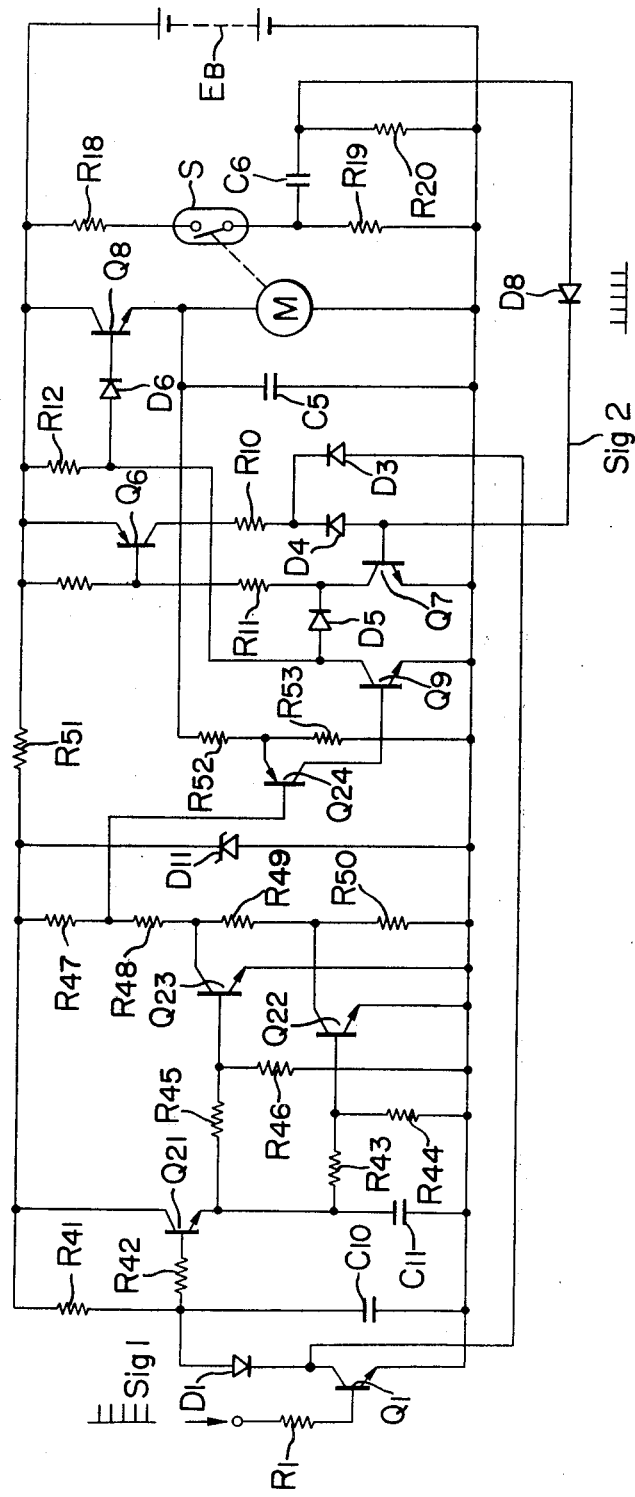
FIG. 8 is a circuit diagram of the third embodiment of the present invention.

At a further reduced frequency of the synchronizing pulse signals for which the condition $t_{in} > t_2$ stands, the transistor Q4 of the second frequency identifying circuit shows conduction periods of $(t_{in} - t_2)$ in synchronization with the frequency of said signals, and the transistor Q5 shifts to the conduction state by the function of retaining condenser C4 similarly as explained before, thereby shortcircuiting the resistors R13 and R14. Thus, the motor is supplied with a voltage:

$$V_{m(i)} = \frac{R15 + R16}{R16} (V_z + V_{BE})$$

which is lower than $V_{m(h)}$ for the case of $t_1 < t_{in} < t_2$ to realize synchronized rotation by the bistable circuit. The relation of the frequency of synchronizing pulse signals and the motor voltage $V_m$ in this case is represented by the line (i) in FIG. 6. In the present embodiment, as the motor voltages at the changeover frequencies $1/t_1$ and $1/t_2$ are located within the range between the lines (a) and (b), the synchronizable frequency range (f') extends from a frequency corresponding to the crossing point of lines (i) and (a) to that corresponding to the crossing point of lines (g) and (b) which is located outside FIG. 6. Also by suitably selecting the bias resistors R3, R4, R7 and R8 so as to satisfy a condition:

$$\frac{R4}{R3 + R4} < \frac{R8}{R7 + R8}$$

it is possible to use a common condenser C21 for both the first and second frequency identifying circuits as realized in a second emboidment shown in FIG. 7. Also FIG. 8 shows a third embodiment, which is different from the first embodiment in that the frequency identifying circuits depend on one integrating resistor and one integrating condenser, and is provided with a peak voltage detecting circuit. Further, while the motor voltage $V_m$ is controlled in the first embodiment by the change of the voltage dividing ratio of the motor voltage detecting circuit against a constant standard voltage obtained by a Zenar diode, the control in the third embodiment is realized by the change of said standard voltage against a constant voltage dividing ratio of the motor voltage detecting circuit. With further reference to said third embodiment, R41 is an integrating resistor and C10 is an integrating condenser. A peak voltage detecting circuit is composed of a resistor R42, a transistor Q21 and a retaining condenser C11, and the potential of said retaining condenser C11 is equal to the maximum voltage of the condenser C10 determined by the frequency of the synchronizing pulse signals, or more exactly the voltage difference between the base and emitter of said transistor Q21.

Serially connected resistors R43 and R44, and another, serially connected resistors R45 and R46 are connected between the terminals of said condenser C11 of the peak voltage detecting circuit to respectively constitute first and second voltage dividing circuits. Said resistors R43, R44, R45 and R46, functioning also as discharging resistors for said condenser C11, are selected so as to enable said condenser C11 to have a sufficiently long discharge time constant, or a long voltage retention time. The connecting points between the resistors R43 and R44 and between the resistors R45 and R46 are respectively connected to the bases of transistors Q22 and Q23, and the voltage dividing ratios are selected so as to satisfy a frequency condition $1/t_1 > 1/t_2$ wherein $t_1$ and $t_2$ are the periods until the conduction of transistors Q22 and Q23, respectively.

A first frequency identifying circuit is composed of said integrating resistor R41, integrating condenser C10, peak voltage detecting circuit, first voltage dividing circuit and transistor Q22, and a second frequency identifying circuit is composed of said integrating resistor R41, integrating condenser C10, peak voltage detecting circuit, second voltage dividing circuit and transistor Q23.

Further a third voltage dividing circuit is composed of serial resistors R47, R48, R49 and R50 which are connected between the terminals of a power supply stabilized by a resistor R51 and a Zener diode D11, and the connecting points between resistors R50 and R49, between R49 and R48, and between resistors R47 and R48 are respectively connected to the collector of said transistor Q22, to the collector of said transistor Q23 and to the base of a transistor Q24.

Between the terminals of motor M there are connected serial resistors R52 and R53 to constitute a voltage dividing circuit, of which divided output of the motor voltage $V_m$ is applied to the emitter of said transistor Q24. Said transistor Q24 is connected at the collector thereof to the base of said transistor Q9 of which the collector is in turn connected through a diode D6 to the base of transistor Q8 so that a negative feedback is realized by said transistors Q24 and Q9 to the transistor Q8 to control the motor voltage. Other elements in the circuits are connected the same as explained in the first embodiment.

The circuit explained above functions as follows. Upon application of synchronizing pulse signals, the frequency thereof is in an inverse relation represented by the maximum charge voltage of said condenser C10, and thus by the voltage of condenser C11 in the peak voltage detecting circuit which detects said maximum charge voltage. Said condenser C11, being provided with a sufficiently long discharge time constant with respect to the frequency of synchronizing pulse signals as explained before, provides a direct current voltage which stands in the above-mentioned relation which the frequency of synchronizing pulse signals. As said transistors Q22 and Q23 shift to conduction state thereof at different frequencies, they remain in the cut-off state for synchronizing pulse signals of a frequency high enough to meet a condition $1/t_{in} > 1/t_1$, and the motor voltage $V_{m(g)}$ in this condition is controlled by the negative feedback circuit according to the following equation:

$$V_{m(g)} = (\frac{R52 + R53}{R53})(V_z \cdot \frac{R48 + R49 + R50}{R47 + R48 + R49 + R50} + V_{BE})$$

wherein $V_{BE}$ is the functional voltage between the base and emitter of transistor Q24 and $V_z$ is the voltage between the terminals of Zener diode D11.

For a lower frequency meeting a condition $1/t_2 < 1/t_{in} < 1/t_1$, the potential of condenser C11 is elevated to shift the transistor Q22 to the conduction state thereof and the motor voltage $V_{m(h)}$ in this case is represented by:

$$V_{m(h)} = (\frac{R52 + R53}{R53})(V_z \cdot \frac{R48 + R49}{R47 + R48 + R49} + V_{BE})$$

which is lower than above-mentioned $V_{m(g)}$. For a further lower frequency meeting a condition $t_{in} < t_2$, the potential of condenser C11 is further elevated to shift the transistor 223 to the conduction state thereof, and the motor voltage $V_{m(i)}$ in this case is represented by:

$$V_{m(i)} = (\frac{R52 + R53}{R53})(V_z \cdot \frac{R48}{R47 + R48} + V_{BE})$$

wherein $V_{m(g)} > V_{m(h)} > V_{m(i)}$. In this manner the voltage $V_m$ supplied to the motor is automatically regulated higher or lower in response to a higher or lower frequency of the input synchronizing pulse signals, thereby realizing continuous synchronization within the range (f') shown in FIG. 6.

Figure 9:
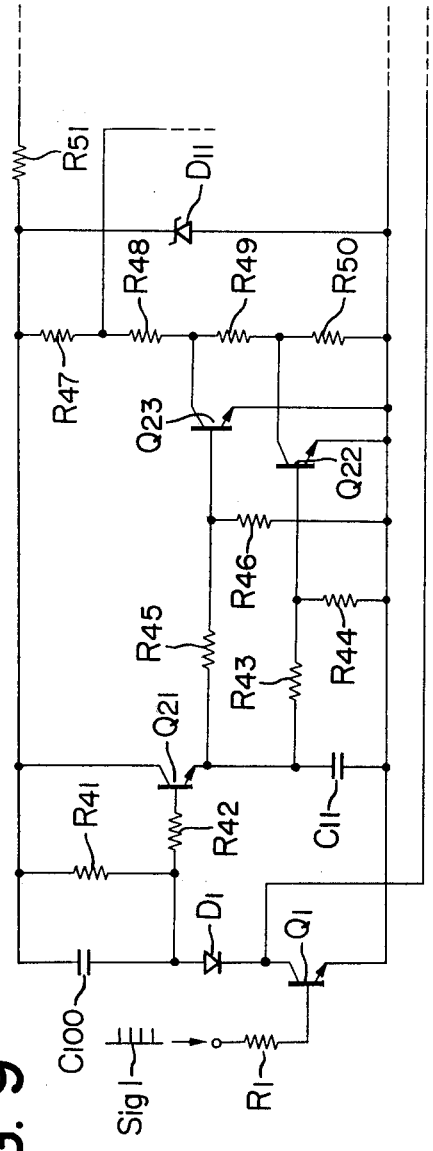
FIG. 9 is a circuit diagram of the fourth embodiment of the present invention.

As a variation to the above-mentioned first, second and third embodiments, it is further possible to regulate the motor voltage by means of the frequency dependence of the discharge potential of an integrating condenser C100 connected in parallel to an integrating resistor R2 as shown in a fourth embodiment of FIG. 9. The transistor Q1, upon reception of positive synchronizing pulse signals thereto through a resistor R40, shifts to the conduction state to start the charging of said condenser C100, which is instantaneously completed, due to very low forward resistance of diode D1, to a voltage which is equal to the power supply voltage corresponding to the Zener voltage of Zener diode D11 minus the voltage drop in said diode D1. The charge accumulated in said condenser C100 is discharged through a resistor R41, as the transistor Q1 immediately returns to the cut-off state.

Thus, the potential difference $V_{in}$ between the connecting point of said condenser C100 and said diode D1, and the negative terminal of power supply increases with lapse of time. As said condenser C100 assumes again the charged state upon reception of next synchronizing pulse, the maximum value of said potential difference $V_{in}$ is inversely related to the frequency of said synchronizing pulse signals. In this manner the states of transistors Q22 and Q23 are determined by the generation of a direct current voltage on the condenser C11 dependent on the maximum value of said potential difference $V_{in}$, and the motor voltage $V_m$ is therefore controlled similarly as in the foregoing third embodiment.

Figure 10:
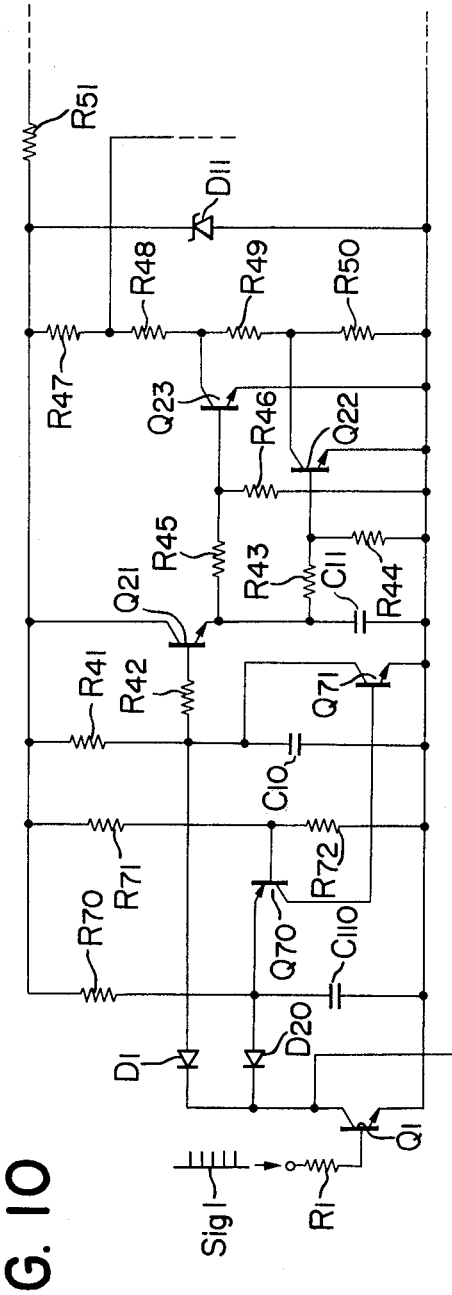
FIG. 10 is a circuit diagram of the fifth embodiment of the present invention.

In a fifth embodiment shown in FIG. 10, an initial state setting circuit is attached to the circuit of the aforementioned third embodiment in order to eliminate the initial delay encountered in said third embodiment. In the absence of synchronizing pulse signals in the circuit of FIG. 8, the condenser C10 is maintained charged to the supply voltage $V_z$ and the condenser C11 is also charged accordingly to maintain the transistors Q23 and Q24 in the conduction state thereof. Upon reception, in this state, of synchronizing pulse signals of a frequency corresponding to a motor voltage $V_{m(g)}$ obtainable when both transistors Q22 and Q23 are in the cut-off state, there appears a delay until the motor voltage $V_m$ reaches a normal value or until the motor reaches normal synchronized rotation due to slow discharge of said condenser C11 to a corresponding voltage as the capacity thereof and the resistance of resistors R43, R44, R45, and R46 functioning also as discharge resistors are selected as explained before. This drawback is eliminated in the fifth embodiment shown in FIG. 10 by short-circuiting the condenser C10 upon interruption of synchronizing pulse signals for a determined period thereby reducing the voltage of condenser C11 to zero. This is realized by a circuit generating an output signal corresponding to an initial state which is identical to the state of receiving synchronizing pulse signals of an infinitely large frequency. The function of said circuit is explained in the following. A resistor R70 and a condenser C110 constitutes an integrating circuit similar to that composed of the resistor R41 and condenser C10 in FIG. 8, and the potential of said condenser C110 is detected by a transistor Q70, which is biased by resistors R71 and R72 to determine the detection potential thereof. Upon arrival of the potential of said condenser C110 to said detection potential, the transistor Q70, and accordingly transistor Q71 shift to the conduction state. Also the charge of said condenser C110, being connected through a back-current impeding diode D20 to the transitor Q1 which is rendered conductive by the synchronizing pulse signals, is reset by said signals. Said detection potential and the values of said resistor R70 and condenser C110 are so selected that the period for the condenser C110 to reach said detection potential after resetting thereof is sufficiently longer than the cyclic time corresponding to the lowest frequency of synchronizing pulse signals. Consequently the transistors Q70 and Q71 are maintained in the cut-off state during the reception of synchronizing pulse signals thereby realizing normal synchronized state as explained in connection with the embodiment shown in FIG. 3. When the synchronizing pulse signals are interrupted, the transistors Q70 and Q71 shift to the conduction state after said determined period to reduce the potential of condenser C10, and accordingly that of condenser C11, to zero, thereby eliminating the aforementioned drawback.

As thus far explained, the present invention makes it possible to automatically change the voltage supplied to the motor according to the frequency of synchronizing pulse signals and thus to automatically realize synchronized control over an extended range of frequency. In the foregoing embodiments the voltage is switched in three steps, but any number of steps equal to or larger than two can be employed according to the necessity.

Figure 11:
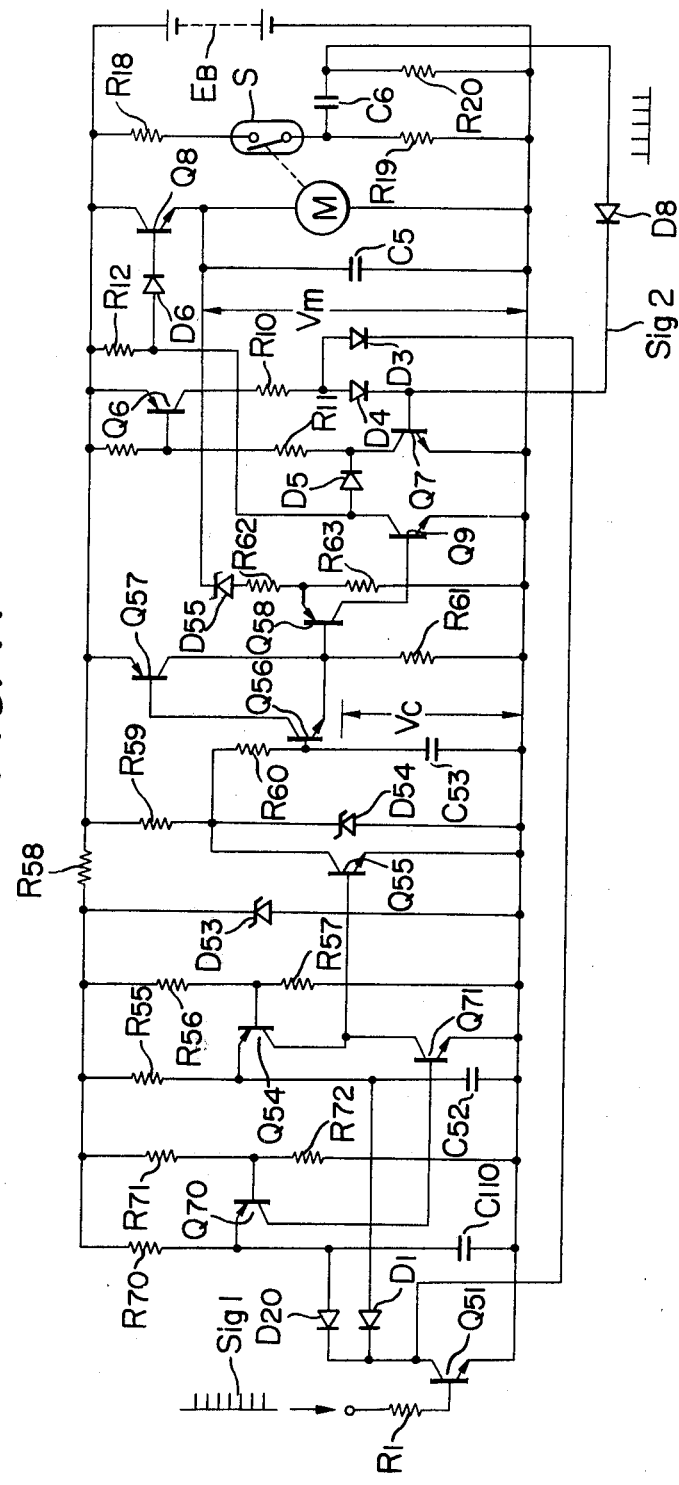
FIG. 11 is a circuit diagram of a sixth embodiment of the present invention.

In the following is explained a sixth embodiment of the present invention with reference to FIG. 11.

A transistor Q51 performs the setting of the aforementioned bistable circuit, of an integrating condenser in the initial state setting circuit and of a frequency duty ratio converting circuit which is to be explained later. Said initial state setting circuit is composed of an integrating resistor R70, an integrating condenser C110, transistors Q70 and Q71, and bias resistors R71 and R72, and the period from the discharge of said condenser C110 to the shift of said transistor Q70 to the conduction state is selected to be longer than the cyclic period corresponding to the minimum frequency of synchronizing pulse signals Sig-1.

Also said frequency duty cycle ratio converting circuit is composed of an integrating resistor R55, an integrating condenser C52, a transistor Q54 and bias resistors R56 and R57. Said condenser C52 which is charged through said resistor R55 and discharged through a back-current impeding diode D1 upon conduction of a transistor Q51, applies the potential thereof to said transistor Q54, which becomes conductive upon arrival of said potential to the conduction potential thereby rendering a transistor Q55 conductive. Said transistor Q54 assumes conductive and cut-off states alternately according to the synchronizing pulse signals Sig-1, and, within cycle time determined by the frequency of said signals Sig-1, stays in the cut-off state for a period determined by the resistance of said resistor R55, the capacity of condenser C52 and the conduction potential of said transistor Q54. Consequently the remaining period during which said transistor Q54 is in the condition state is proportional to the frequency of said synchronizing pulse signals Sig-1. Stated differently this circuit is constructed to convert the frequency of synchronizing pulse signals into a duty cycle ratio, or the proportion of the conductive or the cut-off state of said transistor Q54 in a cyclic time determined by said frequency. The power supply voltage supplied to the initial state setting circuit and to the frequency duty cycle ratio converting circuit is stabilized by a Zener diode D53 and a resistor R58. Another stabilized voltage source is composed of a resistor R59 and Zener diode D54, and an integrating resistor R60 and an integrating condenser C53 are connected in series between the terminals of said Zener diode D54. Also said transistor Q55 is connected in parallel to said Zener diode D54. Said condenser C53 is charged through said resistor R60 by a voltage determined by said Zener diode D54 in the cut-off state of said transistor Q55, and is discharged through said resistor R60 in the conduction state thereof. A duty cycle ratio voltage converting circuit is composed of a transistor Q55, Zener diode D54, resistors R59 and R60 and condenser C53, and the voltage of said condenser C53 is determined by the duty cycle ratio which is obtained by said frequency duty cycle ratio converting circuit as explained later. An impedance converting circuit of a high input impedance and a low output impedance is composed of transistor Q56 and Q57 and a resistor R61, of which the terminal voltage is proportional to that of said condenser C53.

A Zener diode D55 and resistors R62 and R63 are connected in series between the terminals of the motor M, and the voltage dividing terminal between said resistors R62 and R63 is connected to the emitter of a transistor Q58. Said transistor Q58 is connected at the collector thereof to the base of a transistor Q9 which in turn is connected with the collector thereof through a diode D6 to the base of a transistor Q8 thereby controlling the motor voltage by a negative feedback applied to said transistor Q8 by said transistors Q58 and Q9 wherein the base voltage of said transistor Q58 or the terminal voltage of resistor R61 is taken as a standard voltage. The connections and functions of other elements are identical to those in the foregoing embodiments.

Figure 12A:
FIGS. 12A and 12B are diagrams showing the relation between the frequency of synchronizing pulse signals and the charging and discharging of condenser C53 in the circuit of FIG. 11.
Figure 12B:
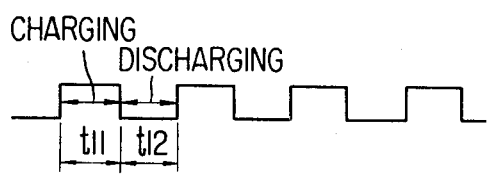

The present circuit functions as follows. In the absence of the synchronizing pulse signals Sig-1, the condenser C110 is maintained at a potential to render the transistor Q70 conductive, and thus the transistor Q71 also conductive. Also the condenser C52 is maintained at a potential to render the transistor Q54 conductive, but the transistor Q55 is in the cut-off state thereof due to the conductive state of transistor Q71 to charge the condenser C53 to a potential determined by the Zener diode D54. The bistable circuit is in the reset state, and the transistor Q8 is accordingly in the cut-off state. Upon reception, in this state, of the synchronizing pulse signals, the transistor Q51 is shifted to the conduction state at each pulse reception with resulting discharge through the diode D20 of the condenser C110, which does not therefore reach the conduction potential of transistor Q70 and changes the transistor Q71 to cut-off state. Similarly the condenser C52 is reset through the diode D1 upon each reception of a pulse signal to shift the transistor Q54 to the cut-off state, which however assumes the conductive and cut-off states alternately since the period $t_{11}$ for the condenser C52 to reach the conductive potential of transistor Q54 after the resetting is selected shorter than the cyclic time of synchronizing pulse signals Sig-1. Thus, the duty cycle ratio DR the of cut-off state of transistor Q54, or the proportion of the period $t_{11}$ of the cut-off state of transistor Q54 in a cyclic time, can be expressed by:

$$DR = t_{11} f (t_{11} \leq 1/f) \tag{1}$$

wherein $f$ stands for the frequency of synchronizing pulse signals Sig-1. Thus, the transistors Q55 and Q54 have the same duty cycle ratio. In the conduction state of transistor Q55, the Zener diode is shortcircuited to cause the discharge of the condenser C53 through the resistor R60, and in the cut-off state said condenser C53 is charged through the resistor R60 to a voltage determined by the Zener diode D54, as shown in FIGS. 12A and 12B, wherein FIG. 12A represents the synchronizing pulse signals Sig-1 of a frequency $f$ while FIG. 12B indicates the terminal voltage of Zener diode D54 controlled by the aforementioned duty cycle ratio converting circuit. The cut-off period ($t_{11}$) and the conduction period ($t_{12}$) of said transistor Q54 respectively correspond to the charging and discharging periods of said condenser C53. Thus, as the resistor R60 and condenser C53 are suitably selected so as to have a time constant sufficiently longer than the synchronizing pulse signals (Sig-1), the cyclic charge-discharge operation as shown by FIG. 12B results in a direct current terminal voltage $V_c$ at the condenser C53 proportional to the duty cycle ratio thereof. Supposing that the input impedance of the circuit of transistors Q56 and Q57 is sufficiently high, and since the charging and discharging are realized through the same resistor R60, said voltage $V_c$ is equal to the duty cycle ratio of the charging period multiplied by the Zener voltage $V_{z1}$ of the Zener diode D54. Also the duty cycle ratio of the charging period is equal to that of the cut-off period of transistor Q54. Thus:

$$V_c = V_{z1} \cdot DR = V_{z1} \cdot t_{11} \cdot f \tag{2}$$

Consequently the voltage $V_c$ of the condenser C53 is proportional to the frequency within a range $t_{11} \leq 1/f$.

Figure 13:
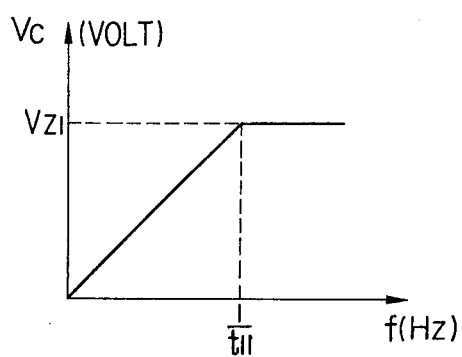
FIG. 13 is a diagram showing the relation between the frequency of synchronizing pulse signals and the voltage $V_c$ of condenser C53 in the circuit of FIG. 11.

In case the frequency $f$ of synchronizing pulse signals Sig-1 is located within a range $t_{11} \geq 1/f$, the potential of condenser C52 is unable to reach the conduction voltage of transistor Q54, which thus remains in the cut-off state. The voltage $V_c$ of condenser C53 therefore becomes a constant value $V_{z1}$ irrespective of the frequency $f$, as shown in FIG. 13 which shows the behavior of direct current voltage $V_c$ of the condenser C53 in ordinate as a function of the frequency $f$ in abscissa. The voltage $V_c$ of the condenser C53 produces, through a converting circuit composed of the transistors Q56 and Q57, and the resistor R61 a proportional voltage $V_R$ between the terminals of said resistor R61, which can be expressed as follows:

$$V_R = V_{z1} \cdot t_{11} \cdot f - V_{BE1} \tag{3}$$

wherein $V_{BE1}$ is the voltage between the base and emitter of transistor Q56. As the negative feedback circuit performs a control function using the voltage $V_R$ between the base of transistor Q58 and the negative terminal of the power supply, the voltage $V_m$ supplied to the motor can be expressed as follows:

$$V_m = \frac{R62 + R63}{R62} (V_R + V_{BE2}) + V_{z2} \tag{4}$$

wherein $V_{z2}$ is the Zener voltage of the Zener diode D55, and $V_{BE2}$ is the voltage between the base and emitter of transistor Q58. By supposing $V_{BE1} = V_{BE2}$ for simplification the equations (3) and (4) can be converted to:

$$V_m = \frac{R62 + R63}{R62} \cdot V_{z1} \cdot t_1 \cdot f + V_{z2}. \tag{5}$$

The relation between the motor voltage $V_m$ and the frequency $f$ of the synchronizing pulse signal Sig-1 in a case where $$V_{z1} = 18V, \frac{R62 + R63}{R62} = 4, t_{11} =$$

$$\frac{1}{36Hz} = 0.028 \text{ sec and}$$

Figure 14:
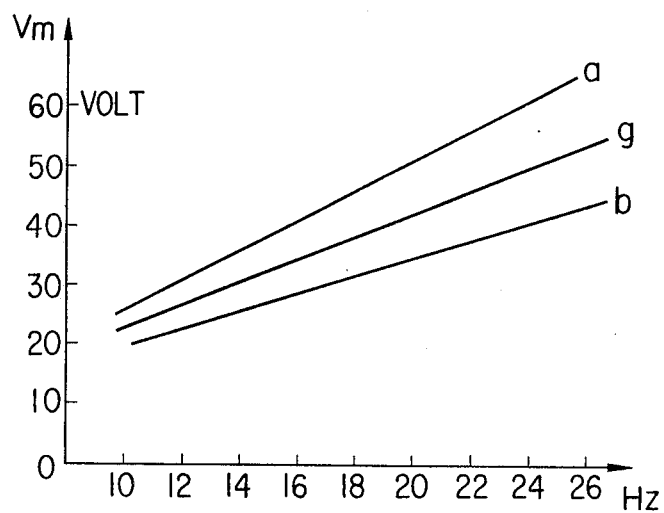
FIG. 14 is a diagram showing the relation between the frequency of synchronizing pulse signals and the voltage applied to the motor in the circuit of FIG. 11.

$V_{z2} = 2$ V in the equation (5) is represented by the line (g) in FIG. 14.

Upon the shift of transistor Q1 to the conduction state by the application of synchronizing pulse signals thereto, the bistable circuit assumes the set state to allow the supply of motor voltage $V_m$ by the negative feedback circuit according to equation (5), thereby causing accelerated rotation of the motor M. Said rotation causes the closing operation of switch S to allow synchronized control if the mutual relation between the motor voltage $V_m$ and frequency is located within the area between the lines (a) and (b) in FIG. 3, as already explained in connection with the circuit of FIG. 1. Upon interruption of Synchronizing pulse signals Sig-1, the bistable circuit is maintained in the reset conductive state by means of the motor speed pulse signals Sig-2 to cut off the transistor Q8, thereby terminating the rotation of the motor M. Also the aforementioned initial state setting circuit renders, after a determined period from the interruption of synchronizing pulse signals, the transistor Q70 conductive, and thus the transistor Q71 also conductive. Consequently the transistor Q55 is shifted to the cut-off state and the voltage $V_c$ of condenser C53 becomes equal to the voltage $V_{z1}$ of the Zener diode D54. In this manner, at the restart of motor M by the reapplication of synchronizing pulse signals Sig-1, the motor voltage control is realized from the high voltage side toward the voltage $V_m$ corresponding to the frequency $f$ of the synchronizing pulse signals thereby improving the response characteristics at the starting operation.

According to the foregoing embodiment of the present invention, it is possible to maintain a stable control even in the case of eventual fluctuation of supply voltage $E_B$ as equation (5) does not contain terms subject to the influence of such fluctuation.

Also the voltage $V_m$ supplied to the motor is regulated linearly, as shown in FIG. 14, between the lines (a) and (b) indicating the upper and lower limit voltages corresponding to a given frequency, and said voltage $V_m$ is therefore less affected, in comparison with stepwise control as in the first embodiment, by the variation of synchronizing frequency range due to fluctuation of motor load. It is also possible to utilize two separate resistors for the charging and discharging of condenser C53 instead of a single resistor R60 in the present embodiment, and to employ a one-shot multi-vibrator for the frequency duty ratio converting circuit.

In the following is explained a seventh embodiment of the present invention shown in FIG. 15, wherein a transistor Q61 performs the setting of the aforementioned bistable circuit and the resetting of an integrating condenser C81 of the initial state setting circuit and of an integrating condenser in the frequency voltage converting circuit which is to be explained later. The aforementioned initial state setting circuit is composed of an integrating resistor R83, an integrating condenser C81, a transistor Q82 and bias resistors R85 and R86. The period from the discharge of said condenser C81 to the shift of said transistor Q82 to the conduction state is selected longer than the cycle time corresponding to the minimum frequency of the synchronizing pulse signals Sig-1. A transistor Q83 is connected at the base thereof to the collector of said transistor Q82 through a resistor R84 and also to a transistor Q61 through a resistor R82. A condenser C82 constitutes an integrating circuit chargeable through a resistor R87 and is reset when the transistor Q83 becomes conductive. The potential of said condenser C82 is applied through a resistor R88 to the base of a transistor Q84. The peak voltage of said condenser C82 is detected by the transistors Q84 and Q85, a condenser C83 and a resistor R89, which potential is followed to the maximum charge voltage of said condenser C82.

The resistance of said resistor R88 is selected sufficiently higher than that of resistor R87, and a circuit of high input resistance is formed by the transistors Q84 and Q85 so as not to affect the integrating time constant of said resistor R87 and condenser C82. The resistor R89 which functions as a discharge resistor for said condenser C83 is selected so as to have a sufficiently long time constant with respect to the frequency of synchronizing pulse signals Sig-1. Said transistors Q83, Q84 and Q85, condensers C82 and C83, and resistors R87, R88 and R89 constitute a frequency voltage converting circuit which generates a direct current voltage across the condenser C83 inversely related to the frequency of said synchronizing pulse signals Sig-1. A transistor Q86 and a resistor R90 constitute an impedance converting circuit which reduces the high output impedance of a circuit composed of said condenser C83 and resistor R89. Consequently the voltage across the resistor R90 is proportional to that across the condenser C83. A resistor R91 and a Zener diode D82 constitute a stabilized standard power source which prevents, as will be explained later, the variation of the motor voltage $V_m$ in case of eventual fluctuation of voltage of power supply $E_B$. The connecting point between the resistor R90 and transistor Q86 is connected to the base of said transistor Q87. A Zener diode D83 and resistors R92 and R93 are connected in series between the terminals of a direct current motor M, and the voltage dividing terminal between said resistors is connected to the emitter of said transistor Q87. Said transistor Q87 is connected at the collector thereof to the base of a transistor Q9 which in turn is connected at the collector thereof through a diode D6 to the base of a transistor Q8 to apply negative feedback thereto, the base voltage of transistor Q87 or the voltage across the resistor R90 being utilized as standard voltage, thereby controlling the voltage $V_m$ supplied to the motor. The Zener diode D83 is inserted in order to correct the frequency characteristics of motor voltage $V_m$, and may be omitted if the circuit constants are selected suitably. The connections and functions of other elements are same as explained before.

In the absence of the synchronizing pulse signals Sig-1, the condenser C81 is at a potential high enough for rendering the transistor Q82, and thus the transistor Q83, conductive. Consequently the potentials across the condensers C82 and C83 are zero, and the bistable circuit is in the reset state thereof, and the motor M is at standstill. Upon reception of synchronizing pulse signals Sig-1, the transistor Q1 is shifted to the conduction state for each pulse to accordingly reset by discharge the condenser C81, the potential of which does not therefore reach the conduction level for the transistor Q82 which is thus shifted to the cut-off state. The transistor Q83, which is connected through a resistor R82 to said transistor Q1, is rendered conductive upon reception of each pulse to reset the condenser C82 by discharging. Thus the maximum charging voltage of said condenser C82 is inversely related with the frequency of synchronizing pulse signals Sig-1. The more frequencies become increased, the less maximum charging voltage becomes decreased. The condenser C83 is in a similar situation and the voltage thereof, which is maintained in a direct current state, is subjected to impedance conversion and appears across said resistor R90. The voltage between the collector and emitter of transistor Q86 is equal to the supply voltage determined by the Zener diode D82 minus the voltage across said resistor R90. Thus the standard voltage between the collector and emitter of transistor Q86 becomes higher or lower when the frequency increases or decreases, and the motor voltage $V_m$ is accordingly controlled when the aforementioned negative feedback circuit functions. On the other hand said bistable circuit is shifted to the set state by the conduction of transistor Q61, thereby rendering the transistor Q8 conductive and putting the negative feedback circuit into operation. In this manner the motor voltage $V_m$ is controlled according to the above-mentioned standard voltage, and a synchronized control is realized in the range between the lines (a) and (b) of FIG. 3 as explained in connection with the circuit shown in FIG. 1. Upon interruption of synchronizing pulse signals Sig-1, the bistable circuit is maintained in the reset state by means of the motor speed pulse signals to shift the transistor Q8 to the cut-off state, thereby terminating the rotation of motor M. Also the aforementioned initial state setting circuit renders, after a determined period from the interruption of signals, the transistor Q83 conductive to reduce the voltages of condensers C82 and C83 to zero. In this manner the response characteristics in the restart operation is improved in that a voltage corresponding to the frequency of synchronizing pulse signals Sig-1 can be immediately achieved upon reapplication of said signals. In the following is given a detailed explanation of the relationship between the frequency of synchronizing pulse signals and the motor voltage controlled thereby. Assuming that the width of a positive pulse in the synchronizing pulse signals Sig-1 is sufficiently shorter than the cycle time thereof, the maximum charging voltage $V_{c2}$ of the condenser C82 can be expressed as follows:

$$V_{c2} = V_{z1}\left(1 - \exp\left(-\frac{1}{f \cdot c82 \cdot R87}\right)\right) \quad (1)$$

wherein $V_{z1}$ is the supply voltage determined by the Zener diode D82 and $f$ is the frequency of the synchronizing pulse signals Sig-1. For the voltage $V_{c3}$ of the condenser C83 which follows the maximum charging voltage $V_{c2}$ of the condenser C82 and which can be considered as a direct current, the voltage drop in the resistor R88 is negligibly small as the current therein is very low due to the presence of a high input resistance circuit. Consequently said voltage $V_{c3}$ can be expressed as follows:

$$V_{c3} = V_{c2} - V_{BE1}$$

$$= V_{z1}\left(1 - \exp\left(-\frac{1}{f c82 \cdot R87}\right)\right) - V_{BE1} \quad (2)$$

wherein $V_{BE1}$ is the voltage between the base and emitter of transistor Q84. As the standard voltage of the negative feedback circuit is the voltage $V_{CE}$ between the collector and emitter of transistor Q86 which is determined by the voltage $V_{c3}$ of condenser C83, there stands the following equation, wherein $V_{BE2}$ is the voltage between the base and emitter of transistor Q86:

$$V_{CE} = V_{z1} - V_{c3} + V_{BE2} \quad (3)$$

$$= V_{BE1} + V_{BE2} + V_{z1}\exp\left(-\frac{1}{f c82 \cdot R87}\right).$$

The motor voltage $V_m$, which is controlled by the negative feedback circuit on the basis of said voltage $V_{CE}$ as the standard voltage, can be expressed by the following equation wherein $V_{z2}$ is the Zenar voltage of Zener diode D83, $V_{BE3}$ is the voltage between the base and emitter of transistor Q87 and $n$ is the voltage dividing ratio by resistors R92 and R93 or $n = (R92 + R93/R92)$:

$$V_m = n(V_{CE} + V_{BE3}) + V_{z2} \quad (4)$$

From equations (3) and (4):

$$V_m = n\left(V_{BE1} + V_{BE2} + V_{BE3} + V_{z1}\exp\left(-\frac{1}{f \cdot c82 \cdot R87}\right)\right) + V_{z2} \quad (5)$$

$$= n\left(A + V_{z1}\exp\left(-\frac{1}{f \cdot c82 \cdot R87}\right)\right) + V_{z2}$$

wherein $A = V_{BE1} + V_{BE2} + V_{BE3}$.

In order that the characteristic line defining the frequency $f$ and motor voltage $V_m$ according to equation (5) passes an arbitrary point $(f_o, V_{mo})$ selected in FIG. 3, there is derived from equation (5):

$$V_{mo} = n\left(A + V_{z1}\exp\left(-\frac{1}{f \cdot c82 \cdot R87}\right)\right) + V_{z2}. \quad (6)$$

Consequently the values of condenser C82 and resistor R87 are defined by:

$$\frac{1}{c82 \cdot R87} = f_o \log_e\left(\frac{V_{z1}}{\frac{V_{mo} - V_{z2}}{n} - A}\right). \quad (7)$$

By inserting the values of resistance R87 and condenser C82 into equation (5) there is obtained:

$$V_m = V_{z2} + n\left(A + V_{z1}\exp\left(-\frac{f_o}{f}\log_e\frac{V_{z1}}{\frac{V_{mo} - V_{z2}}{n} - A}\right)\right) \quad (8)$$

The equation (8) indicates that $V_{z1}$, $V_{z2}$, $n$, $A$, $f_o$ and $V_{mo}$ are arbitrary independent variables selected within a range:

$$\frac{V_{z1}}{\frac{V_{mo} - V_{z2}}{n} - A} > 1$$

as $C82 \cdot R87 > 0$, and that the characteristic line of motor voltage $V_m$ and frequency of synchronizing pulse signals thus defined by said variables always passes an arbitrary point $(f_o, V_{mo})$ with an increase or decrease of voltage $V_m$ respectively according to an increase or decrease of frequency and with other parameters to be determined by the independent variables $V_{z1}$, $V_{z2}$, $n$ and $A$. Also the values of condenser C82 and resistor R87 are given by equation (7). Thus it is possible to achieve synchronized control over an extended frequency range by placing the characteristic line of the motor voltage $V_m$ and frequency $f$ by synchronizing pulse signals within the range defined by the lines (a) and (b) in FIG. 3.

Figure 16:
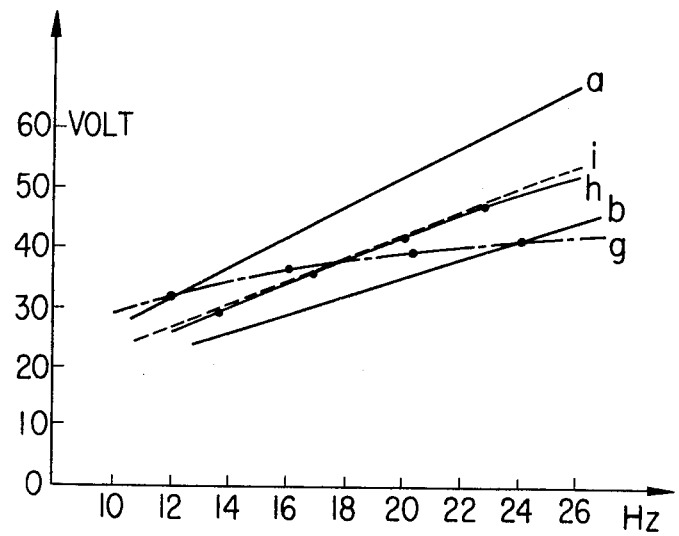
FIG. 16 is a diagram showing the relation between the frequency of synchronizing pulse signals and the voltage applied to the motor in the circuit of FIG. 15.

Examples of such a line are shown in FIG. 16, wherein $f_o$ and $V_{mo}$ are 18 Hz and 38 V respectively to be located between the lines (a) and (b). Also $V_{BE1} = V_{BE2} = V_{BE3} = 0.6$ V, so that A = 1.8 V. The line (g) shows a case with independent variables $V_{z1} = 12$ V, $V_{z2} = 0$ V and n = 4, which is provided with a synchronizable frequency range wider than the corresponding range (f) in FIG. 3. The lines (h) and (i) show the cases with independent variables to allow still wider synchronizable frequency ranges, wherein $V_{z1} = 12$ V, $V_{z2} = 0$ V and n = 10 for the line (h) and $V_{z1} = 18$ V, $V_{z2} = 6$ V and n = 8 for the line (i).

Figure 15:
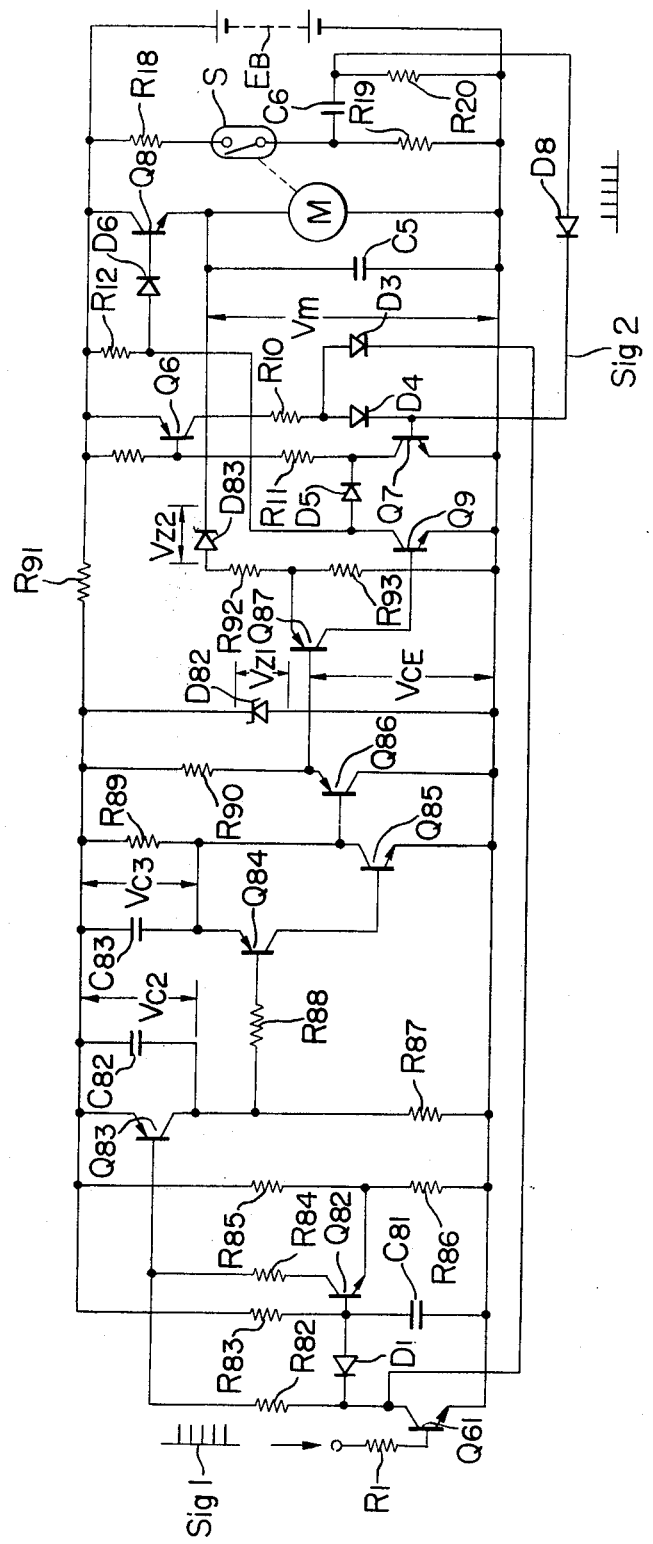
FIG. 15 is a circuit diagram of a seventh embodiment of the present invention.

Since equation (8) representing the characteristics of the embodiment shown in FIG. 15 does not contain a term subject to the influence of voltage fluctuation of power supply, the control is stably maintained even in the presence of such eventual fluctuation.

Figure 17:
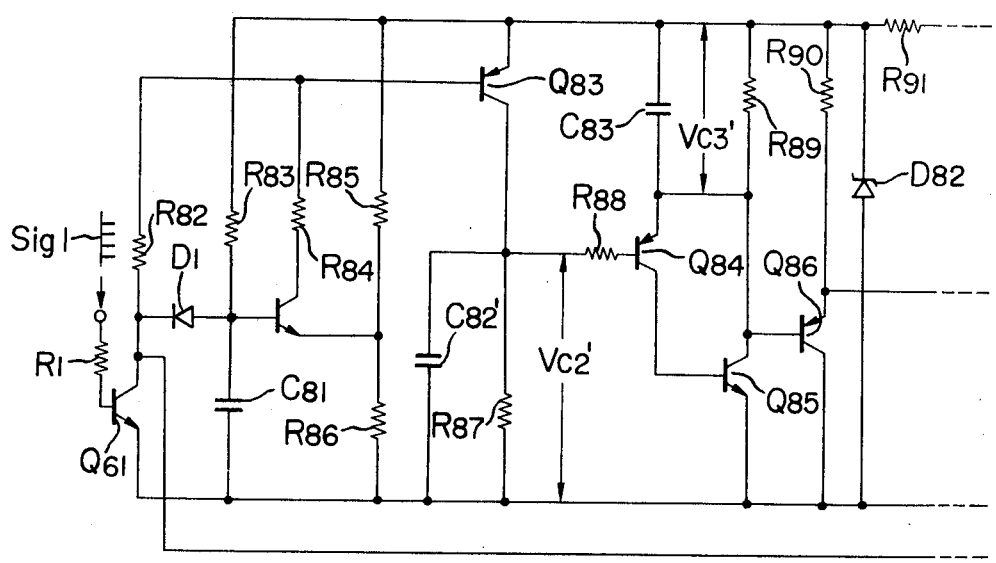
FIG. 17 is a circuit diagram of an eighth embodiment of the present invention.

FIG. 17 shows an eighth embodiment of the present invention which is different from the seventh embodiment in FIG. 15 in that control is realized by detecting the minimum discharge voltage of a condenser C82' through a resistor R87, said minimum voltage being a function of the frequency of synchronizing pulse signals Sig-1.

The circuit shown in FIG. 17 is partly omitted as it is identical to the circuit of FIG. 15 except that the condenser C82 in the latter is replaced by a condenser C82' which is connected in parallel to the resistor R87. Upon reception of synchronizing pulse signals Sig-1, the transistor Q83 is rendered conductive as in the circuit of FIG. 15, and the condenser C82' is instantaneously charged to a voltage $V_{z1}$ determined by the Zener diode D82. When the transistor Q83 shifts to cut-off state, the charge in the condenser C82' is discharged through the resistor R87. Assuming that the current in the resistor R88 is negligibly small, the relation between the minimum discharge voltage across said condenser C82' and the frequency of consecutive synchronizing pulse signals Sig-1 is expressed by the following equation:

$$V_{c2} = V_{z1} \exp\left(-\frac{1}{fC82'R87}\right) \quad (9)$$

The voltage $V_{c'3}$ of the condenser C83, which follows the maximum voltage between the collector and emitter of transistor Q83 which in turn is equal to the supply voltage $V_{z1}$ minus aforementioned minimum discharge voltage $V_{c'2}$ is expressed as follows:

$$V_{c'3} = V_{z1} - V_{c'2} - V_{BE1}$$

$$= V_{z1}\left(1 - \exp\left(-\frac{1}{fC82'R87}\right)\right) - V_{BE1} \quad (10).$$

Thus the control can be achieved as in the first embodiment as $V_{c'3} = V_{c3}$ by selecting C82' = C82. Upon interruption of synchronizing pulse signals Sig-1, the bistable circuit is reset to the conduction state to shift the transistor Q8 to cut-off state, thereby terminating the rotation of motor M. Also by the operation of aforementioned initial state setting circuit the condenser C82' assumes the supply voltage $V_{z1}$ after a determined period to reduce the voltage $V_{c'3}$ of the condenser C83 to zero thereby improving the response characteristics in the identical manner as in the first embodiment.

According to the seventh and eighth embodiments of the present invention explained above, the motor voltage $V_m$ can be regulated almost linearly, as shown in FIG. 16, between the lines (a) and (b) defining the upper and lower limit voltages corresponding to each frequency, and thus is less affected, in comparison with the stepwise control as in the first embodiment, by the variation of synchronizable frequency range due to eventual load fluctuation of the motor.

As thus explained, the present invention enables an automatic synchronized control over an extended frequency range with a simple circuit as the motor voltage is automatically determined in response to the frequency of the synchronizing pulse signals.

I claim:

1. A drive circuit for a pulse synchronized motor for controlling the rotational speed of the motor in response to a synchronizing pulse signal instructing the rotational speed of the motor, comprising:
   a circuit for detecting the rotational speed of the motor and for generating a periodic pulse signal proportional thereto;
   a circuit responsive to the synchronizing pulse signal for automatically producing in accordance with the frequency of the synchronizing pulse signal a DC voltage applied to the motor having a voltage value at which the motor can be in synchronization with the rotational speed instructed by the synchronizing pulse signal; and
   a bistable circuit for interrupting application of said voltage to the motor, the bistable circuit being placed in one of its states by the synchronizing pulse signal and being placed in its other state by the motor speed pulse signal.

2. A drive circuit according to claim 1, wherein the producing circuit comprises:
   a converting circuit generating a voltage corresponding to the frequency of the synchronizing pulse signal;
   a plurality of frequency identifying circuits responsive to the generated voltage of the converting circuit, each of the frequency identifying circuits having a corresponding operating voltage and generating an identifying signal every time the generated voltage of the converting circuit reaches the corresponding operating voltage; and
   a voltage setting circuit having an input responsive to the identifying signals and generating a voltage applied to the motor which varies in a step-wise manner according to the magnitude of the frequency of the synchronizing pulse signal.

3. A drive circuit according to claim 2, wherein the converting circuit is an integrating circuit for generating a voltage corresponding to the time interval between pulses of the synchronizing pulse signal.

4. A drive circuit according to claim 3, wherein the frequency identifying circuits each comprise:
   a first reference voltage source producing a reference voltage; and
   a comparator circuit for comparing the generated voltage of the integrating circuit and the reference voltage and producing an identifying signal when those voltages reach a predetermined relation.

5. A drive circuit according to claim 4, wherein the voltage setting circuit comprises:
   a second reference voltage source producing a constant reference voltage; and a negative feedback circuit for step-wise changing the voltage applied to the motor in response to an identifying signal from the comparator circuit, the operation of the negative feedback circuit being controlled by the operation of the bistable circuit.

6. A drive circuit according to claim 5, wherein the negative feedback circuit comprises:
   a voltage divider including a plurality of divider resistors connected in series between opposite terminals of the motor and having a terminal at which a voltage representing the variation of the dividing ratio is derived;
   a plurality of switching circuits connected to the comparator circuit, the switching circuits short-circuiting corresponding divider resistors in response to identifying signals from the comparator circuit;
   a first active element supplying an electric current to the voltage divider and the motor, the first active element starting to supply the current when the bistable circuit is placed in one state and stopping supplying the current when the bistable circuit is placed in said other state; and
   a second active element varying the impedance of the first active element so as to vary the terminal voltage of the voltage divider relative to the voltage of the second reference voltage source, thus controlling the supplying of the electric current.

7. A drive circuit according to claim 3, wherein the frequency identifying circuits comprise:
   a peak voltage detecting circuit generating a voltage corresponding to the peak value of the voltage produced by the integrating circuit; and
   a plurality of detecting circuits each of which has a corresponding operating voltage and generates an identifying signal every time the voltage of the peak voltage detecting circuit reaches the corresponding operating voltage.

8. A drive circuit according to claim 7, wherein the voltage setting circuit comprises:
   a voltage divider circuit generating a step-wise voltage in response to identifying signals from the detecting circuit; and
   a negative feedback circuit generating the voltage applied to the motor which varies step-wise in response to the voltage generated by the voltage divider circuit, the operation of the negative feedback circuit being controlled by the operation of the bistable circuit.

9. A drive circuit according to claim 8, wherein the negative feedback circuit comprises:
   two divider resistors connected in series between opposite terminals of the motor;
   a first active element supplying an electric current to the divider resistors and the motor, the first active element beginning to supply the electric current when the bistable circuit is placed in one state and stopping the supplying of the current when the bistable circuit is placed in the other state; and
   a second active element varying the impedance of the first active element so as to vary the voltage generated by the voltage divider circuit relative to the voltage at the junction point between the two divider resistors and to control the supplying of the current.

10. A drive circuit according to claim 1, wherein the voltage producing circuit comprises:

a frequency to duty cycle ratio converting circuit which is in a first state for a fixed time from the arrival of a synchronizing pulse and in a second state between the fixed time of the first state and the arrival of the succeeding synchronizing pulse and which reverts to the first state upon arrival of the succeeding synchronizing pulse, to thereby convert the frequency of the synchronizing pulse signal to a duty cycle ratio signal representing that portion of the period of the synchronizing pulse signal occupied by the second state;
a duty cycle ratio to voltage converting circuit which generates a voltage changing in one direction corresponding to the fixed time when the frequency to duty cycle ratio converting circuit is in the first state and generating a voltage changing in the opposite direction corresponding to the time between the fixed time and the arrival of the succeeding synchronizing pulse; and
a voltage setting circuit having an input responsive to the voltage generated in the duty cycle ratio to voltage converting circuit and generating a voltage applied to the motor which continuously increases or decreases according to the magnitude of the frequency of the synchronizing pulse signal.

11. A drive circuit according to claim 10, wherein the frequency to duty cycle ratio converting circuit comprises:
   a first integrating circuit which generates a voltage according to a time interval between synchronizing pulses, the integrating circuit having an output voltage which is reset every time a synchronizing pulse arrives;
   a reference voltage source generating a constant reference voltage; and
   a comparator circuit which generates a first signal when a synchronizing pulse arrives and generates a second signal when the relation of the voltage of the integrating circuit and the reference voltage reaches a predetermined relation.

12. A drive circuit according to claim 11, wherein the duty cycle ratio to voltage converting circuit comprises:
   a switching circuit which is rendered non-conductive in response to the first signal from the comparator circuit and conductive in response to the second signal; and
   a second integrating circuit which generates an increasing voltage corresponding to the interval during which the switching circuit is rendered non-conductive and which generates a decreasing voltage from the voltage generated immediately before the switching circuit is rendered conductive, the time constant of the second integrating circuit when the decreasing voltage is produced being set higher than the period of the synchronizing pulse signal.

13. A drive circuit according to claim 12, wherein the voltage setting circuit is a negative feedback circuit, the feedback circuit comprising:
   two divider resistors connected in series between opposite terminals of the motor;
   a first active element supplying an electric current to the divider resistors and the motor, the first active element beginning to supply the current when the bistable circuit is placed in one state and cutting off the current when the bistable circuit is placed in the other state; and a second active element which changes the impedance of the first active element in order to vary the voltage of the junction point between the two resistors relative to the output voltage of the second integrating circuit, thus controlling the supply of the current.

14. A drive circuit according to claim 1, wherein the voltage producing circuit comprises:
  a first integrating circuit generating a voltage corresponding to the time interval between synchronizing pulses, the voltage generated by the first integrating circuit being reset in response to each synchronizing pulse;
  a voltage holding circuit detecting the peak output voltage of the first integrating circuit and generating an output voltage corresponding to the detected peak output voltage, the output voltage being substantially held independent of the synchronizing pulse signal; and
  a negative feedback circuit having an input responsive to the output voltage of the voltage holding circuit and generating a voltage applied to the motor which is continuously increased or decreased according to the magnitude of the frequency of the synchronizing pulse signal.

15. A drive circuit according to claim 14, wherein the first integrating circuit comprises:
  a charging circuit having a first charging resistor and a first capacitor connected in series; and
  a switching circuit for controlling the charging or discharging of the first capacitor, the switching circuit causing the first capacitor to be discharged in response to impression of the synchronizing pulse signal and to be charged when the impression ceases.

16. A drive circuit according to claim 15, wherein the voltage holding circuit comprises:
  a second capacitor;
  a detecting circuit which is operated, when the first capacitor starts to charge, to cause the second capacitor to be charged to a voltage corresponding to the voltage of the first capacitor and which is not operated when the first capacitor starts to be discharged; and
  a discharging resistor for discharging the voltage of the second capacitor, the time constant of the discharging resistor and the second capacitor being set higher than the period of the synchronizing pulse signal.

17. A drive circuit according to claim 16, wherein the negative feedback circuit comprises:
  two dividing resistors connected in series between opposite terminals of the motor;
  a first active element supplying an electric current to the dividing resistors and the motor, the first active element starting to supply the current when the bistable circuit is placed in one state and cutting off the supply of current when the bistable circuit is placed in the other state; and
  a second active element varying the impedance of the first active element in order to vary the voltage at the junction point between the two dividing resistors relative to the terminal voltage of the second capacitor, thus controlling the supply of current.

* * * * *